United States Patent
Woodell et al.

(10) Patent No.: US 7,307,583 B1
(45) Date of Patent: Dec. 11, 2007

(54) ANTENNA ADJUSTMENT SYSTEM AND METHOD FOR AN AIRCRAFT WEATHER RADAR SYSTEM

(75) Inventors: Daniel L. Woodell, Marion, IA (US); Gregory J. Koenigs, Cedar Rapids, IA (US); Charles J. Dickerson, Alburnett, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 236 days.

(21) Appl. No.: 11/153,972

(22) Filed: Jun. 16, 2005

Related U.S. Application Data (60) Provisional application No. 60/688,951, filed on Jun. 9, 2005.

(51) Int. Cl.
G01S 7/40 (2006.01)
G01S 13/95 (2006.01)

(52) U.S. Cl. ............. 342/173; 342/174; 342/26 R; 342/26 B; 342/77; 342/81

(58) Field of Classification Search ......... 342/26 R, 342/26 A, 26 B, 26 C, 26 D, 74–77, 81, 342/173, 174
See application file for complete search history.

(56) References Cited

U.S. PATENT DOCUMENTS

| | | | | |
|---|---|---|---|---|
| 4,277,845 A | | 7/1981 | Smith et al. ............ 455/52 |
| 4,435,707 A | * | 3/1984 | Clark ............... 342/26 B |
| 4,628,318 A | * | 12/1986 | Alitz ............... 342/26 D |
| 4,685,149 A | | 8/1987 | Smith et al. ............ 455/56 |
| 5,049,886 A | | 9/1991 | Seitz et al. ............ 342/26 |
| 5,175,554 A | * | 12/1992 | Mangiapane et al. .... 342/149 |
| 5,198,819 A | | 3/1993 | Susnjara |
| 5,247,303 A | * | 9/1993 | Cornelius et al. ....... 342/26 D |
| 5,831,570 A | * | 11/1998 | Ammar et al. .......... 342/26 B |
| 5,945,926 A | * | 8/1999 | Ammar et al. .......... 340/970 |
| 6,208,284 B1 | | 3/2001 | Woodell et al. ......... 342/30 |
| 6,377,202 B1 | * | 4/2002 | Kropfli et al. ......... 342/26 R |
| 6,388,607 B1 | | 5/2002 | Woodell ............... 342/26 |
| 6,388,608 B1 | | 5/2002 | Woodell et al. ......... 342/26 |
| 6,424,288 B1 | | 7/2002 | Woodell ............... 342/26 |
| 6,473,026 B1 | * | 10/2002 | Ali-Mehenni et al. .... 342/26 R |
| 6,512,476 B1 | | 1/2003 | Woodell ............... 342/26 |
| 6,549,161 B1 | | 4/2003 | Woodell ............... 342/26 |
| 6,603,425 B1 | | 8/2003 | Woodell ............... 342/26 |
| 6,741,203 B1 | | 5/2004 | Woodell ............... 342/26 |
| 6,879,280 B1 | | 4/2005 | Bull et al. ............ 342/26 |
| 6,882,302 B1 | | 4/2005 | Woodell et al. ......... 342/26 |

(Continued)

OTHER PUBLICATIONS

"A simple based on DSP antenna controller of weather radar", XianQin Wang; She Yong; JinWei He; BeiChuan Zhu Radar, 2001 CIE International Conference on, Proceedings 2001 pp. 1071-1074.*

*Primary Examiner*—John B Sotomayor
(74) *Attorney, Agent, or Firm*—Nathan O. Jensen; Kyle Eppele (57) ABSTRACT

A weather radar system or method can be utilized to adjust a position of a weather radar system. The weather radar system can utilize processing electronics coupled to an antenna control system. The processing electronics can determine an error associated with the position of the weather radar antenna and adjust the position of the weather radar antenna in response to data related to returns received by the weather radar antenna and data related to expected returns.

20 Claims, 6 Drawing Sheets

U.S. PATENT DOCUMENTS

| | | | |
|---|---|---|---|
| 7,109,913 B1 * | 9/2006 | Paramore et al. | 342/26 B |
| 7,129,885 B1 * | 10/2006 | Woodell et al. | 342/26 B |
| 7,161,525 B1 * | 1/2007 | Finley et al. | 342/26 R |
| 7,218,268 B2 * | 5/2007 | VandenBerg | 342/25 R |
| 7,242,343 B1 * | 7/2007 | Woodell | 342/26 B |
| 7,242,345 B2 * | 7/2007 | Raestad et al. | 342/74 |

* cited by examiner

ANTENNA ADJUSTMENT SYSTEM AND METHOD FOR AN AIRCRAFT WEATHER RADAR SYSTEM

The present application claims priority to and hereby incorporates by reference U.S. Provisional Patent Application Ser. No. 60/688,951 entitled "Weather Radar System" (05CR167/KEP) filed by Woodell, et al., on Jun. 9, 2005 and assigned to the Assignee of the present application.

FIELD OF THE INVENTION

The present invention relates generally to antenna adjustment and/or calibration for aircraft radar systems. More particularly, the present invention relates to a method of and a system for more accurately determining position errors associated with a radar antenna.

BACKGROUND OF THE INVENTION

U.S. Pat. No. 6,424,288 invented by Daniel L. Woodell and assigned to the assignee of the present invention disclosed a system for and methods of displaying radar information using weather radar systems. Weather radar systems generally include an antenna coupled to a receiver/transmitter circuit and a tilt control system. The tilt control system can be an entirely electronic system for directing radar signals from the antenna by electronically configuring the antenna or can be an electro-mechanical system that physically moves the antenna.

The tilt control system and the receiver/transmitter circuit are coupled to a processor. The processor provides transmit signals through the receiver/transmitter circuit to the antenna to transmit radar beams. The processor receives return signals derived from radar returns received by the antenna. The return signals are provided to the processor via the receiver/transmitter circuit.

The processor also provides signals to the tilt control system to control the position of the antenna. The position of the antenna can be adjusted with respect to its tilt angle. In addition, the tilt control circuit can allow adjustments to the elevation and roll of the antenna.

Current generation weather radar systems use automatic antenna tilt control to command antenna azimuth scans at desired elevation angles relative to the horizon of the weather radar system. As scans occur, aircraft orientation can change. The weather radar system can accommodate random components associated with aircraft orientation by receiving an indication of the aircraft orientation from sensors or other aircraft equipment. The radar system uses the aircraft orientation to correct antenna position so that the azimuth scan occurs across the horizon at a fixed elevation regardless of aircraft orientation.

To provide the most effective radar operation, the radar antenna should be positioned at known placements with respect to the aircraft. For example, to provide the most effective weather sensing operation, the weather radar antenna should be positioned at known placements with respect to the aircraft. All classes of automatic airborne weather radar systems have performance that is dependent upon the quality of the antenna beam position versus the environmental estimates of that position. These classes of automatic airborne weather radar systems include weather radar systems manufactured by Rockwell Collins, Inc., Honeywell International, Inc. and others.

Many factors can contribute to antenna placement or pointing errors (e.g., pointing errors with respect to the expected bore sight angle). Errors can be relatively dynamic and/or relatively constant. Some errors can be due to installation issues and mounting hardware tolerances. These errors tend to be relatively constant. Once detected, calibration with respect to errors due to installation issues and mounting hardware tolerances can be achieved.

Other pointing errors can be more dynamic. For example, airframes associated with aircraft can change shape due to pressurization, uneven heating, and loading. Applicants have found that these changes in shape of the airframe can affect the expected position of the antenna (especially the expected elevation, pitch, and roll position of the antenna). Other errors can be due to atmospheric phenomenon, such as the lensing effect associated with the atmosphere. Dynamic pointing errors and/or fixed errors can also occur due to errors associated with the sensing of the aircraft's orientation.

Heretofore, adjustment to antenna position has been performed in response to observed performance of the weather radar system. According to one conventional technique, the antenna or bore site is aimed from a known position to a known fixed target position. The actual return is analyzed to make adjustments to the antenna position. The antenna is manually or electronically trimmed to a more accurate position. According to another conventional technique, the antenna is positioned using optical tools.

Thus, there is a need for a system for and a method of adjusting the position of an antenna for optimum weather radar performance. Further still, there is a need for real time or pseudo-real time adjustments to antenna position to compensate for dynamic errors associated with weather radar systems. Yet further, there is a need for a weather radar system optimized to determine antenna offset errors. Yet further still, there is a need for a system that automatically detects antenna offset errors and provides adjustment to the antenna. There is also a need for a weather radar system that can determine errors associated with the roll, elevation, and pitch of an antenna.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a weather radar system. The weather radar system includes a weather radar antenna, an antenna control system for adjusting a position of the weather radar antenna, and processing electronics. Processing electronics are coupled to the antenna control system. The processing electronics determine an error associated with the position of the weather radar antenna. The processing electronics adjust the position of the weather radar antenna in response to data related to returns received by the weather radar antenna and data related to expected returns.

Another exemplary embodiment relates to a method of determining an error factor associated with an antenna of an aircraft radar system. The method includes receiving radar returns, determining a first factor related to the weather radar returns, and determining a second factor related to a modeled return estimation without using the radar returns associated with the first factor. The method further includes determining the error factor using the first factor and the second factor.

Another exemplary embodiment relates to an apparatus. The apparatus is for determining an adjustment to correct at least one position error associated with an antenna of an aircraft radar system. The apparatus includes means for determining a first factor related to the weather radar returns, means for determining a second factor using altitude information, and means for determining the adjustment using the first factor and the second factor.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 1:
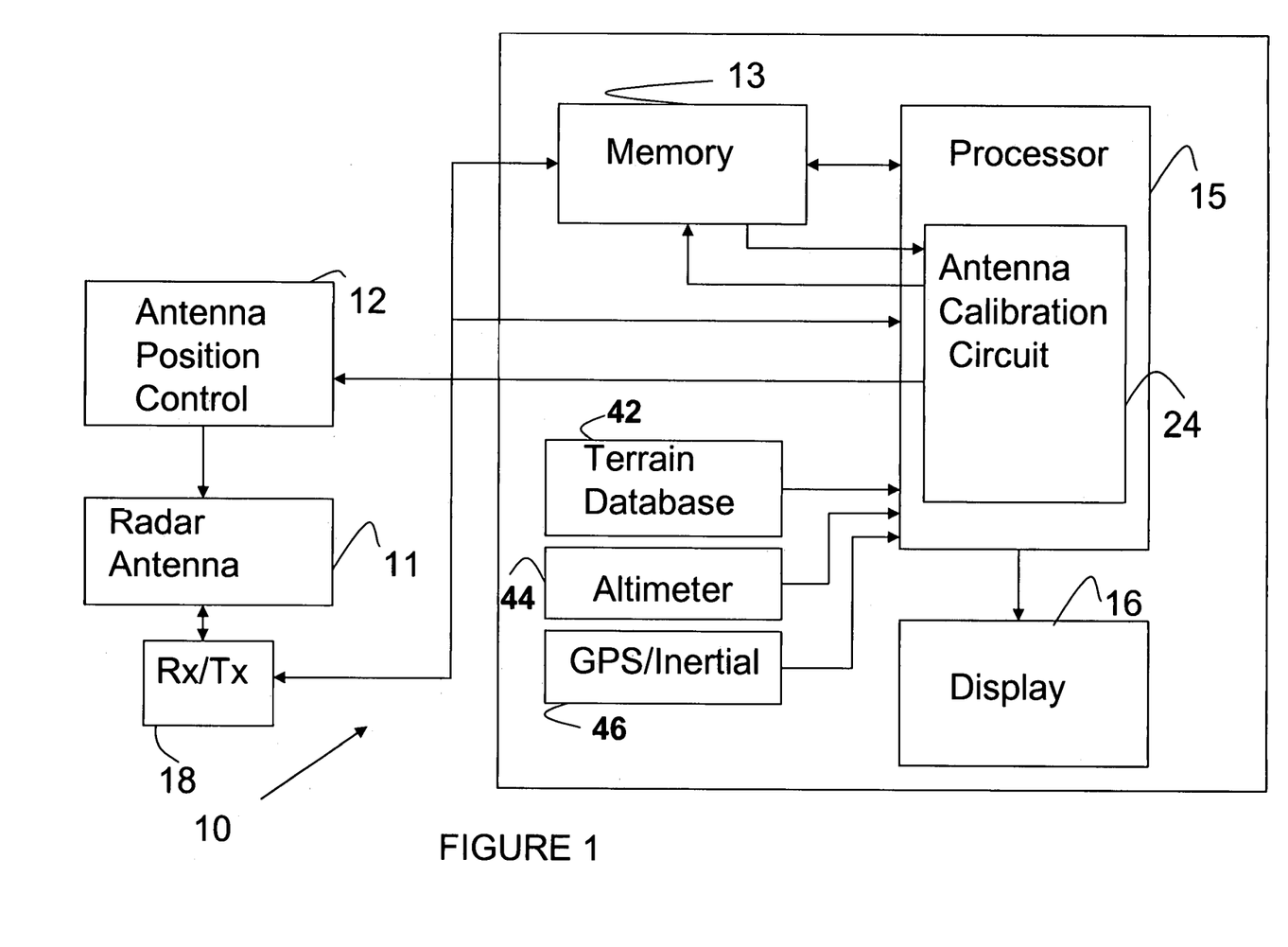
FIG. 1 is an exemplary general block diagram of a weather radar system in accordance with an exemplary embodiment.

Referring now to FIG. 1, a weather radar system 10 which may be used on an aircraft is depicted. Weather radar system 10 can be similar to the system described in U.S. Pat. No. 6,388,608 configured to include an antenna position error correction system as described below. System 10 preferably includes a radar antenna 11, a processor 15, a memory 13, a receiver/transmitter circuit 18, an altimeter 44, a GPS and/or inertial navigation system 46, a terrain database 42 and an antenna position control system 12. System 10 also includes an antenna trim or antenna calibration circuit 24.

System 10 can be a multi-scan radar system or similar system manufactured by Rockwell Collins configured to include the features associated with antenna calibration circuit 24. Alternatively, system 10 can be an RDR 4000 system or similar system manufactured by Honeywell International, Inc. configured to include the features associated with antenna calibration circuit 24. The type of weather radar system is not disclosed in a limiting fashion. The principles of the present invention are applicable to any aircraft weather radar system in which adjustments to an antenna position are desirable.

Antenna position control system 12 preferably is a mechanism that can adjust radar antenna 11 in accordance with signals from antenna calibration circuit 24. Antenna position control system 12 can include controls for manually or automatically controlling the tilt angle, elevation, and pitch of antenna 11. Antenna position control system 12 can implement changes to radar antenna 11 via electronic configuration or via mechanically moving antenna 11. The particular technique for adjusting or trimming the position of antenna 11 and/or the direction at which it is aimed is not discussed in a limiting fashion.

Antenna calibration circuit 24 is shown in FIG. 1 as part of processor 15. However, antenna calibration circuit 24 can be a separate circuit or separate software. Circuit 24 can be operated in conjunction with the operations of processor 15 or separately from the operations of processor 15. Circuit 24 can be embodied as its own software routine operating on its own platform.

Antenna calibration circuit 24 preferably calculates errors associated with the position of radar antenna 11 and adjusts the position of radar antenna 11 in accordance with those errors. Circuit 24 can compensate for at least one of (preferably all) elevation errors, trim control errors, pitch errors, and roll errors. Alternatively, antenna calibration circuit 24 can calculate other types of positioning errors and provide the appropriate adjustment via antenna position control system 12.

Processor 15 is preferably a weather radar return processing unit used to calculate standard deviations of wind velocities, to generate turbulence alerts, and to provide a display signal to display 11. Preferably, display 16 provides a graphical representation of radar returns received by processor 15. Display 16 preferably provides color graphical images corresponding to the intensity of the radar returns. The graphical images can represent weather regions, rainfall densities, turbulence regions, etc.

Display 16 can also include an additional signal scan smoothing memory. The memory is used to store one scan and limit the display of radically different data on the next sweep which is done at the same tilt angle.

Memory 13 can refer to a single or several storage devices. In one embodiment, memory 13 includes volatile and non-volatile storage. Memory 13 can be memory included with the hardware platform associated with system 10. Memory 13 can be a PROM, DRAM, disk drive, Flash memory, SRAM, or other storage device.

The details about system 10 are provided in an exemplary fashion. The principles of the present application are applicable to any weather radar system utilizing radar data for a display. The type of error and offset data, its storage, and its processing path are not described in a limiting fashion unless specifically recited in the claims. The various components and circuits described below can be implemented in almost any hardware or software configuration depending upon design parameters and system criteria.

In a preferred embodiment, processor 15 and circuit 24 are implemented in software subroutines. The subroutines can be executed on one or more digital signal processors associated with system 10. In one embodiment, system 10 uses a hardware platform of a WXR-2100 weather radar system manufactured by Rockwell Collins, Inc. or an RDR 4000 weather radar system manufactured by Honeywell, International, Inc. However, the present invention is not limited to any type of hardware platform.

In operation, processor 15 of system 10 provides signals, either directly to receiver/transmitter circuit 18 or indirectly through memory 13, to provide radar beams at radar antenna 11. Preferably, processor 15 is configured to operate system 10 as a multi-scan, multi-tilt angle radar system or a volumetric radar system in which radar beams are produced at more than one tilt angle. Processor 15 receives radar returns through receiver/transmitter circuit 18.

Processor 15 can receive the radar returns (or signals/data related thereto) directly or through memory 13. Receiver/transmitter circuit 18 can be a single path or can have separate circuits for a receive path and a transmit path.

According to one embodiment, antenna calibration circuit 24 receives radar returns from memory 13 and determines a range to the Earth's surface. In one preferred embodiment, the range calculated from the radar returns is based upon a ratio of radar beams from a multiple tilt angle radar system. Preferably, calibration circuit 24 calculates the ratio of return power between two antenna beams. The ratio of return power is used to estimate the angles to the average range of the sample region.

Antenna calibration circuit 24 also determines angles to the average range of the sample region to the Earth's surface based upon geographic parameters (e.g., preferably information which is not derived from the radar returns utilized to determine the range to the Earth's surface). The geographic parameters can include location and altitude. The geographic parameters can be derived from GPS (system 46), inertial navigation systems (system 46), Earth models, terrain databases (database 42) other navigational aids, or combinations thereof. Preferably, the angles to the average range of the sample region derived from the geographic parameters are expressed as a function of the ratio of more than one radar return.

Antenna calibration circuit 24 compares the two radar return ratios to determine an error associated with the position of radar antenna 11. The error can be expressed in terms of offsets to antenna position. In one embodiment, the offsets are an elevation offset, a pitch offset and a roll offset (collectively, offset data). The offset data is stored in memory 13 and provided to antenna position control system 12 to adjust the position of radar antenna 11. In a preferred embodiment, processor 15 can receive the offset data and provide the position control signals to antenna position control system 12 with adjustments made to the position control signals in accordance with the offset data. In an alternative embodiment, the offset data can be provided directly to system 12 to cause system 12 to adjust the position of antenna 11.

Preferably, antenna calibration circuit 24 periodically determines the error and calculates the offset data to antenna position control system 12. The offset data can be calculated every 4 seconds and stored in memory 13 after each calculation. Alternatively, circuit 24 can calculate the offset data at every radial, at the end of an entire scan, every two seconds, or at other events when data is complete enough for the error functions and yet the calculations do not interfere with the other functions of system 10. Alternatively, the error data can be stored rather than the offset data.

In one embodiment, a running average of the offset data is stored in memory 13. If antenna calibration circuit 24 determines that an error calculation or offset calculation is invalid or disqualified, antenna calibration circuit 24 can use a stored error or offset stored data from memory 13. In this way, antenna calibration circuit 24 ensures that radar antenna 11 has its position adjusted in accordance with the most recent valid offset data or a running average of valid offset data.

The offset data and/or error data can also be provided to display 16 for viewing by the pilot, maintenance personnel, or others. The offset data or the error data provided can be display 16 as display 16 provides graphical images associated with weather radar data.

Figure 2:
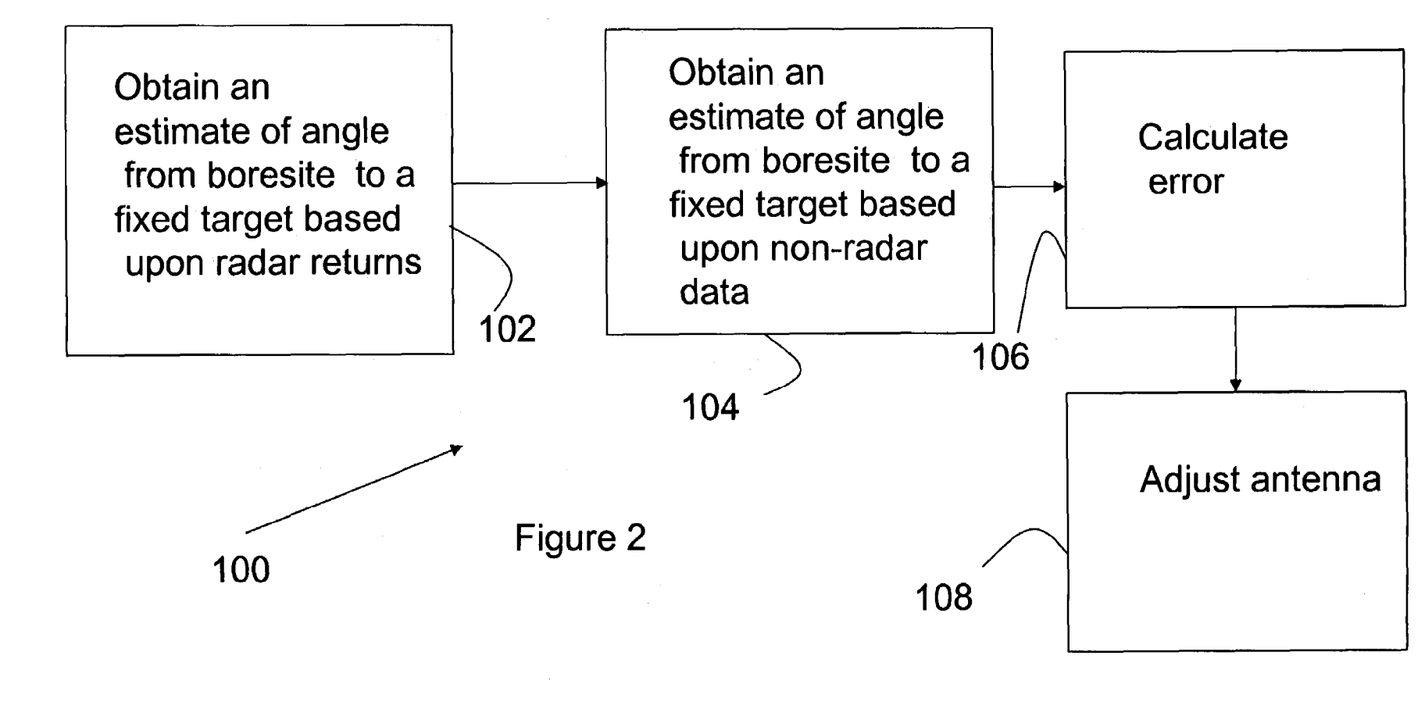
FIG. 2 is a flow diagram showing operation of the weather radar system illustrated in FIG. 1 in accordance with another exemplary embodiment.

As shown in FIG. 2, a flow chart 100 shows one exemplary operation of radar system 10. At a step 102, an estimate of the angle from the bore site of antenna 11 to a fixed target is made. The estimate is made based upon radar returns. The fixed target is preferably a location on the surface of the Earth.

At a step 104, an estimate of the angle from the bore site to the fixed target is made based upon non-radar data. Non-radar data can be geographical data as discussed above. The estimate can be derived from altitude and position data from system 46, database 42 and altimeter 44. At a step 106, the estimate of the angle from the bore site to the fixed target based upon radar returns is compared to the estimate of the angle from the bore site to a fixed target based upon non-radar data and an error is calculated. At a step 108, the position of antenna 11 is adjusted via antenna position control system 12.

Figure 3:
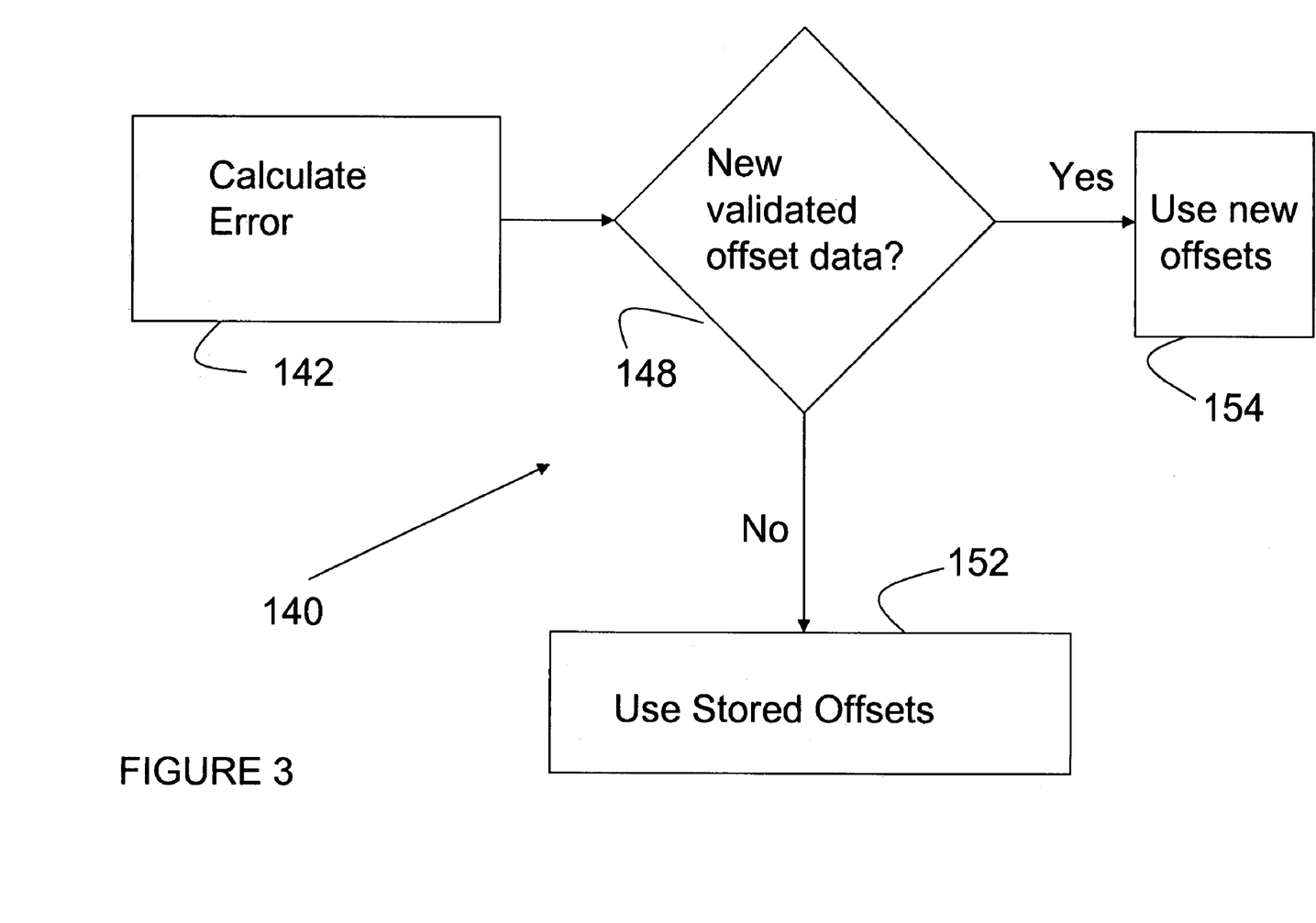
FIG. 3 is a flow chart showing operation of the system illustrated in FIG. 1 in accordance with yet another exemplary embodiment.

With reference to FIG. 3, a flow chart 140 shows another exemplary operation of system 10. At a step 142, an error associated with antenna position is calculated. In one embodiment, the error can be calculated according to step 106 of process 100 described with reference to FIG. 2. Alternatively, the error can be calculated based upon the techniques described below with respect to FIGS. 4 and 5.

At a step 148, the error data is validated. Preferably, the error is validated in step 148 by comparing the error with respect to reasonable inferences of error. In addition, portions of the error can be compared to other portions to determine the legitimacy of the error. For example, the error can be expressed as vector data. Data within the vector data can be compared to determine legitimacy of the data.

If the data is deemed to be valid at step 148, new offsets are calculated utilizing the error data and used by processor 12 to position antenna 11 or provided directly to antenna position control system 12 to adjust antenna 11. If the data is not validated at step 148, system 10 utilizes stored offset data or values (such as a running average or the last previous validated data) to adjust the position of radar antenna 11.

As discussed above, adjusting the position of radar antenna 11 can be provided before the position control signal reaches antenna position control system 12. Calibration circuit 24 or processor 15 can adjust the control signals utilized to ordinarily position radar antenna 11 in accordance with the offset data, thereby adjusting the control signal before antenna 11 is positioned. The adjustment is made to reduce the error calculated by calibration circuit 24.

By continually operating flow chart 140 the error is continuously analyzed and accommodated. In this way, a single sample of data does not adversely affect the operation of system 10 during an entire flight. System 10 preferably operates in real time or near real time.

Figure 4:
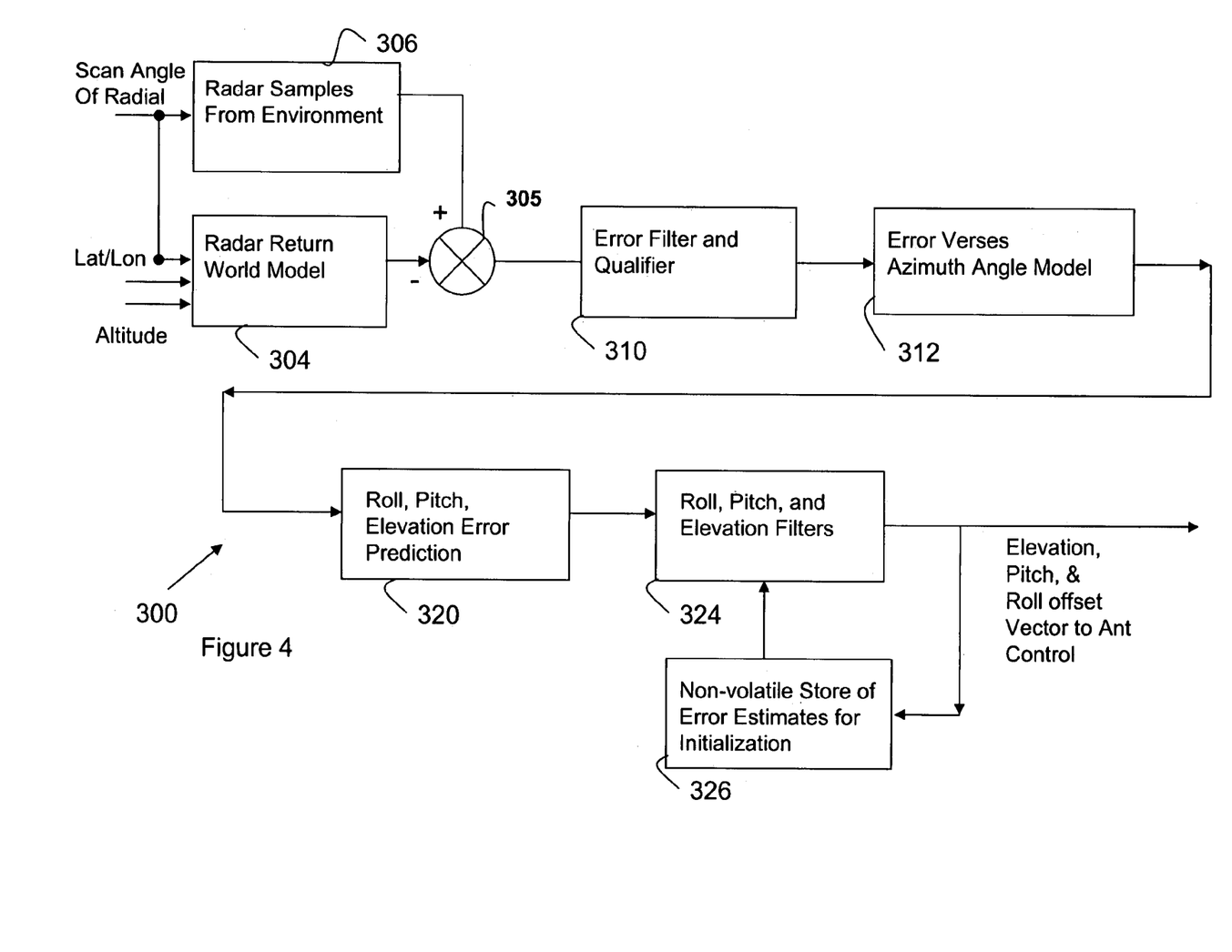
FIG. 4 is a flow diagram showing operation of the system illustrated in FIG. 1 in accordance with still another exemplary embodiment.

With reference to FIG. 4, a preferred exemplary embodiment of antenna calibration circuit 24 operates according to a flow chart 300. At a step 304, circuit 24 determines estimated radar returns based upon the latitude, longitude and altitude of the aircraft. The altitude is preferably a corrected altitude, an above ground level (AGL) parameter derived from altimeter 44 or some other altitude source (GPS, etc.). At a step 306, radar return samples are received from receiver/transmitter circuit 18. Preferably, the radar return samples are performed at a scan angle across a radial. The estimated radar returns calculated step 304 are at the scan angle associated with step 306 and compared via a vector adder 305 to determine an error in the form of vector error data.

The vector error data error from adder 305 is filtered and qualified according to a step 310. All available data points within the error vector are averaged to produce a single low variance mean error value. At the same time, the variance of the error vector is computed. Variance is used as a quality control term that allows good data vectors to be used in the antenna adjustment process and poor error vectors to excluded from the process. Preferably, step 310 compares the error data associated with a number of sectors in each scan. If a number of sectors in the scan qualify, that data is utilized. If not, the data from the entire scan is not utilized.

At a step 312, the filtered and qualified error data is translated into azimuth angles and stored. At step 312, the qualified and filtered error data is merged into a model of tilt angle error versus azimuth angle. Alternatively, the model can be in any coordinate system (e.g., Cartesian, Rho and Theta, etc.).

At a step 320, roll, pitch and elevation errors are predicted from the data produced at step 312 by solving the tilt error model at +/−90 degree and 0 degree scan angle locations. The roll error equals ½ of the tilt error model solved at 90 degrees minus ½ the roll error solved at −90 degrees. The elevation error equals ½ the roll error solved at 90 degrees and ½ the error solved at −90 degrees. The pitch error equals the elevation error minus the tilt error solved at zero degrees.

At a step 324, the roll, pitch and elevation error predictions are filtered. The filtered roll, pitch and elevation error predictions are stored in a non-volatile storage at a step 326. These filtered roll, pitch and elevation error predictions stored at step 326 can be utilized when system 10 is initialized (at start-up, at the beginning of each flight, etc.). In addition, the elevation, pitch and roll error predictions are provided as elevation, pitch and roll offset vectors to antenna position control system 12. Alternatively, the offsets vectors can be provided to processor 15 which adjusts control signals to control system 12 in accordance with the offsets.

Figure 5:
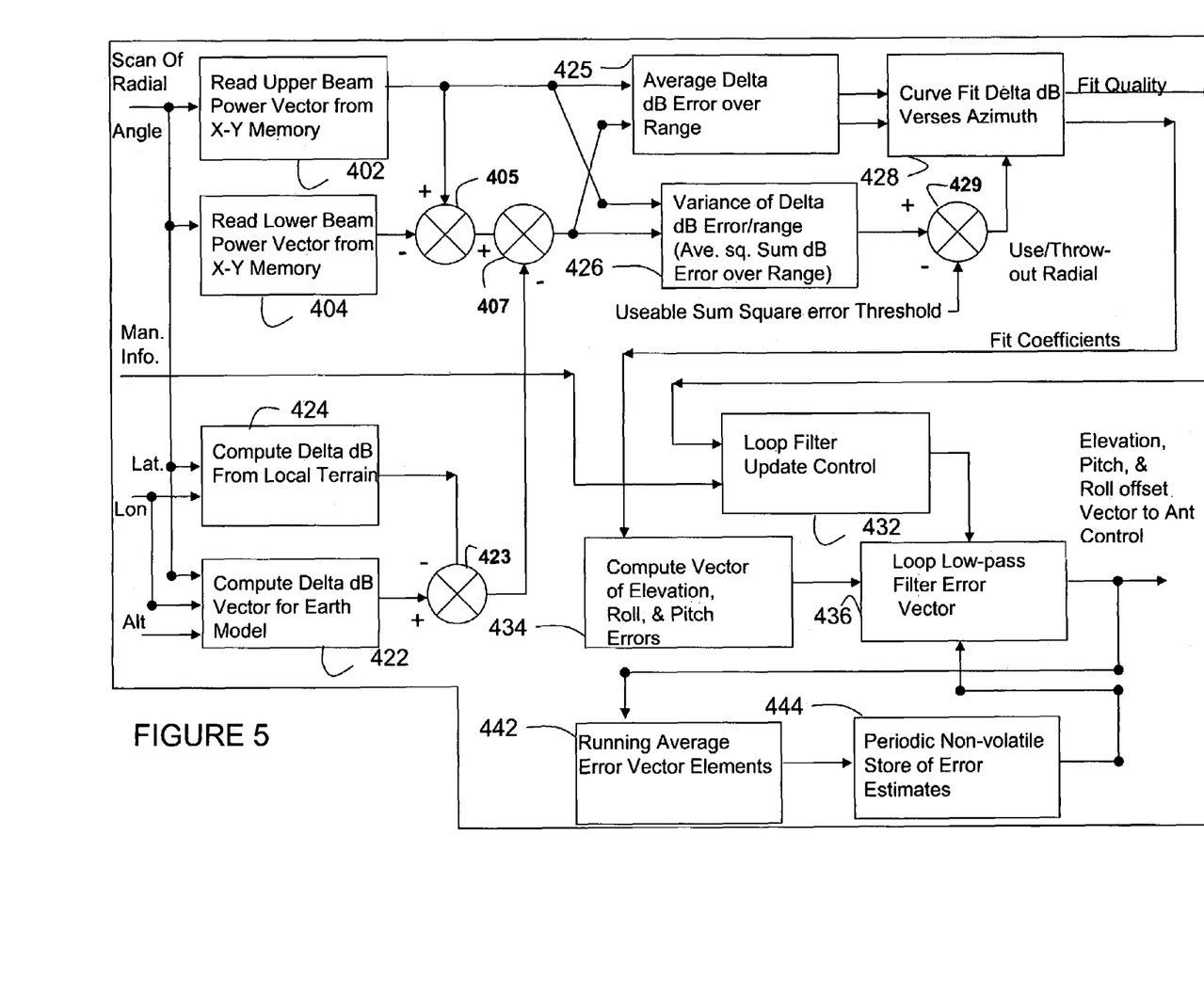
FIG. 5 is a more detailed flow diagram showing operation of the system illustrated in FIG. 1 in accordance with still another exemplary embodiment.

With reference to FIG. 5, a more detailed flow chart 400 shows an exemplary operation of system 10. At a step 402, an upper beam power vector from XY memory is read from memory 13. At a step 404, a lower beam power vector from XY memory is read from memory 13. XY memory refers to a mechanism where radar return power estimate data may be stored in a Cartesian form.

The upper beam power vector and the lower beam power vector are provided to a vector adder 405 and compared to determine a power ratio. Preferably, the upper beam power vector and the lower beam power vector are provided as data in log form (decibel (dB) reference).

Preferably, steps 402 and 404 utilize ranges in accordance with a relationship with altitude. For example, at an altitude from 10,000 to 20,000 feet, ranges of 33-65 nautical miles are utilized. For altitudes of 20,000 to 30,000 feet, ranges of 65-90 nautical miles are utilized. For altitudes of 30,000 feet to 50,000 feet, ranges of 90 nautical miles to 166 nautical miles are utilized.

Subtracting the upper beam power vector from the lower beam power vector in vector adder 405 obtains a power ratio (e.g. delta dB). The power ratio from adder 405 is indicative of the angle within the beam sets to the average sample range from the Earth's surface.

In one preferred exemplary embodiment, system 10 is a multi-scan weather radar system that utilizes dual beam operation to differentiate weather from ground clutter by computing the difference in power vectors from an upper and lower beam according to steps 402 and 404. Advantageously, these dual beam processes are driven from the difference in return power from two or more beams, thereby reducing sensitivity to the absolute level of power (only the ratio between the two beams is utilized). According to another embodiment, a volumetric radar scan using multiple beams to probe the environment can be utilized to determine angle to ground targets.

At a step 422, a delta dB vector associated with an Earth model is provided to a vector adder 423. The Earth model is preferably a 4/3 diameter Earth model which corrects for index of refraction due to the atmosphere. The Earth model uses the latitude and longitude and the altitude of the aircraft.

At a step 424, a delta dB vector associated with local terrain is provided. The delta dB vector from local terrain can be provided from local terrain database 42. Step 424 advantageously reduces errors in the estimation of antenna errors when steps 402 and 404 sense ground clutter produced by non-flat ground clutter. In one embodiment, local terrain database 42 provides offsets associated with hills, valleys, or other small deviations associated with the Earth's surface. Alternatively, other devices can be utilized to provide an indication of local terrain.

The delta dB vector associated with the local terrain is provided to vector adder 423. The delta dB vector associated with local terrain is combined with the delta dB vector for the Earth model and provided to a vector adder 407 which receives the difference of the upper beam power vector and the lower beam power vector from adder 405.

At a step 426, the difference of the ratio of the upper beam to the lower beam and the difference of the delta dB vector for the Earth model and the delta dB vector from local terrain is provided to step 426 and to step 425. Step 426 averages the square sum dB error over the range utilizing the upper beam power vector. Step 425 averages the delta dB error corrected for terrain over the sample range.

The variance of the corrected delta dB error vector is computed by step 426. The computed variance is used as a quality control term. The amount of variation in the delta dB error data is minimized in steps 425 and 426. The delta dB error vector is preferably averaged in range with a first order least mean square (LMS) fit over a fixed sample range.

After step 426, the average square sum dB error over the range is provided to a vector adder 429 which receives an input from the usable sum square error threshold. Vector adder 429 removes unwanted radials as explained below with respect to step 428.

At a step 428, a curve fit delta dB versus azimuth is computed both as a low pass filter function operating across azimuth and as an input to a final quality control function that computes the square sum error between the fit and the input data. Data sets that produce large square summed residuals between the fit and the input data are disallowed from modifying the current antenna adjustment set since large sum squared errors are indicative of a poor quality curve fit or weather contamination. The output of step 428 can be expressed as fit coefficients.

The decision to use or not to use the average delta dB error is done by comparator or vector adder 429 by comparing the information variance of the corrected delta dB error from step 426 to a threshold. The threshold is set to a level that allows normal variations associated with clutter to be used in step 428. Radials that are contaminated by weather generally produce large variances of the corrected delta dB vector. Contaminated vectors are preferably excluded from the antenna adjustment process when their estimate variance exceeds a threshold value. The threshold value is preferably set to not disqualify returns that exhibit the normal variation in terrain returns.

A second order LMS fit across azimuth is utilized (in step 428). Errors due to beam elevation position are generally fixed or slowly varying and can be reasonably modeled by a second order fit. The second order fit in azimuth both averages in azimuth and models the typical errors found in elevation.

At a step 434, roll, pitch and elevation errors are predicted from the fit coefficients produced at step 428 by solving the delta dB line fit at +/−90 degree and 0 degree scan angle locations. The roll error equals ½ of the tilt error model solved at 90 degrees minus ½ the roll error solved at −90 degrees. The elevation error equals ½ the roll error solved at 90 degrees and ½ the error solved at −90 degrees. The pitch error equals the elevation error minus the tilt error solved at zero degrees.

These errors are low pass filtered to slow down changes and provided to system 12 at a step 436. A step 432 is utilized with maneuver information to provide control of step 436. Step 432 is a control for controlling the filtering at step 436.

At a step 442, a running average of the error vectors are calculated. At a step 444, the running average are stored in memory 13, preferably, non-volatile memory.

Figure 6:
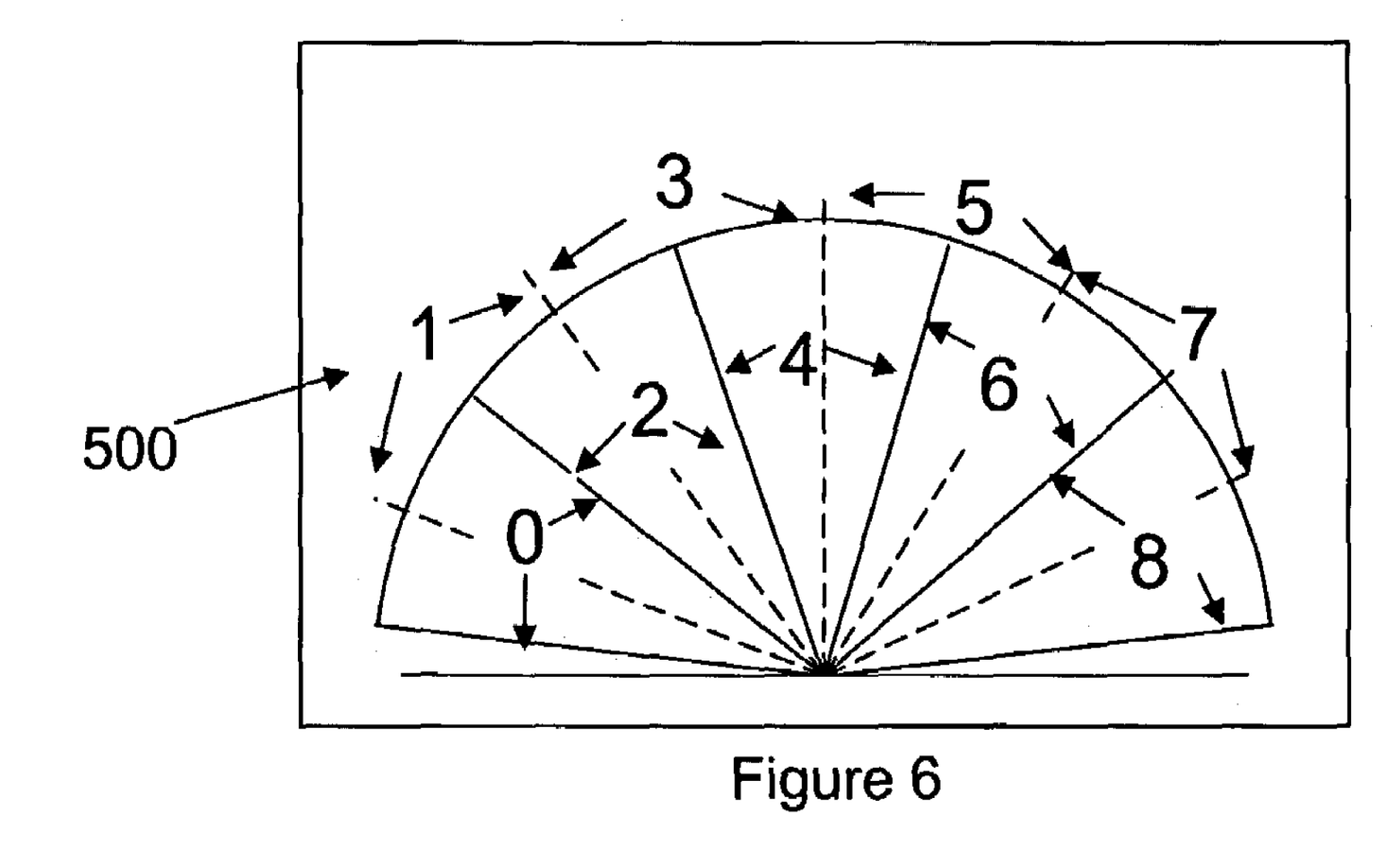
FIG. 6 is a general illustration of a sector field across an azimuth scan for use in a scan qualification process for the system illustrated in FIG. 1 in accordance with still another exemplary embodiment.

With reference to FIG. 6, step 426 and vector adder 429 utilize an array of sectors. Preferably, array 500 is from −80° to +80° and divided into nine equal sectors. Preferably, even numbered sectors overlap with odd numbered sectors as shown in FIG. 6. In order for a sweep to qualify, the sweep must have at least one left sector, one center sector and one right sector that qualify.

With reference to FIG. 1-5, an algorithm executed by processor 12 and/or antenna calibration circuit 24 can be utilized to estimate antenna position errors associated with the elevation access of antenna 11. The steps used to generate the estimate of antenna errors that impact the elevation access of the radar are as follows:

Items Done at Beginning of a Radar Sweep

1. For a given corrected altitude, compute the starting range for the sample region in which to sample delta dB.
2. For a given corrected altitude, compute the initial delta dB at the starting range.
3. For a given corrected altitude, compute the expected delta dB at the midpoint of the integration range.
4. For a given corrected altitude, compute the exponential decay factor.
5. For a given corrected altitude, compute the correction slope for terrain in dB/foot.
6. Set the modeled dB term to be used as the initial delta dB.
7. Compute a delta dB vector from the initial dB decaying at rate computed above starting at the beginning of the sample range.

Items Done per Range Bin

8. Filter the local terrain in range with a simple first order filter with a beta of 0.05 for rising terrain and 0.7 for falling terrain.
9. Multiply the filtered local terrain error term by the correction slope computed above.
10. Subtract the local terrain error term in dB from the bin's delta dB.
11. Subtract the modeled delta dB from the bin's estimated delta dB.
12. For samples with sufficient upper beam magnitude, use the corrected delta dB term in a running average to compute the average over the entire sample range. Keep track of the number of samples used.

Items Done per Azimuth End

13. Compute the average corrected delta dB.
14. Compute the square sum errors of the each radial's corrected delta dB estimate.

Items Done at End of Radar Sweep

15. Qualify each azimuth with a minimum number of samples and an error lower than a fixed threshold.
16. Compute the number of qualified samples per azimuth segment.
17. Qualify the entire sweep data set if a "left", "right", and "center segment is available.
18. Execute a second order curve fit on the qualified delta dB data verses azimuth angle.
19. Compute a normalized error term from the differences between the fit and the qualified data.
20. If normalized error is less than a threshold, continue the error update process.
21. Compute the delta dBs from the fitted equation at the left, center and right regions of azimuth.
22. Compute the sensed angle errors from the polynomial results at the left, right, and center.
23. Compute the roll error, pitch error, and elevation error.
24. Pitch, roll, and elevation errors are added to pitch, roll, and elevation offsets to generate new pitch, roll, and elevation offset estimates.
25. If data is determined to be qualified, new offsets and current offsets are filtered together to produce new offset estimates.
26. Keep a running average of filtered offsets from qualified sweeps.
27. If no previous values were stored, and two minutes of qualified sweeps (26) are detected, store the average of the filtered offsets. Sweeps need not be contiguous.
28. If previous values were stored, and 20 minutes of qualified sweeps (264) are detected, store the average of the filtered offsets. Sweeps need not be contiguous.
29. At power up, if previous values are stored, the offsets are set in the stored values.
30. Loop is not active unless the baro altitude is at least 17,000 feet. Below that altitude, stored values are to be used for offsets.
31. Loop is not to be active if the aircraft is maneuvering. Maneuvering consists of changes in heading, roll, altitude offset, or stabilization saturation.

32. If loop is not active, the last valid offsets are used.
33. The servo reset command sets all offsets, average and storage values at zero.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and mathematical operations are shown in a non-limiting fashion. Although azimuth scans are shown and described, the present invention not limited to such scans, radar system can be utilized with vertical, diagonal or other types of radar scans. Furthermore, other substitutions, modifications, changes, and omissions may be made in the design, operating conditions, and arrangement of the exemplary embodiments without departing from the scope of the invention as expressed in the appended claims.

What is claimed is:

1. A weather radar system, comprising:
   a weather radar antenna;
   an antenna control system for adjusting a position of the weather radar antenna; and
   processing electronics, coupled to the antenna control system, for determining an error factor or an adjustment factor in response to data related to returns received by the weather radar antenna and data related to expected returns, the processing electronics causing the antenna control system to adjust the position of the weather radar antenna in response to the error factor or the adjustment factor.

2. The weather radar system of claim 1, wherein the processing electronics determines an error representing at least one of a pitch error, an elevation error, and a roll error.

3. The weather radar system of claim 1, wherein the data related to returns is representative of a range derived from a ratio of an upper and lower radar beam.

4. The weather radar display system of claim 1, wherein the data related to expected returns utilizes data from a local terrain data base.

5. The weather radar display system of claim 4, wherein the data related to expected returns utilizes an Earth model.

6. A weather radar system, comprising:
   a weather radar antenna;
   an antenna control system for adjusting a position of the weather radar antenna;
   processing electronics, coupled to the antenna control system, for determining an error associated with the position of the weather radar antenna, wherein the processing electronics determines an error factor or an adjustment factor in response to data related to returns received by the weather radar antenna and data related to expected returns and stores the error factor or adjustment factor, the processing electronics causing the antenna control system to adjust the position of the weather radar antenna in response to the error factor or adjustment factor.

7. The weather radar display of claim 6, wherein the error factor or the adjustment factor is averaged.

8. The weather radar display of claim 7, wherein the error factor or adjustment factor is not averaged when the error factor or adjustment factor is not qualified via a qualification process.

9. The weather radar display system of claim 8, wherein the qualification process utilizes a vector field of overlapping zones, wherein a predetermined number of zones is used to qualify the error factor or adjustment factor.

10. A method of determining an error factor associated with an antenna of an aircraft radar system, the method comprising:
    receiving radar returns;
    determining a first factor related to the radar returns;
    determining a second factor related to a modeled return estimation without using the radar returns associated with the first factor; and
    determining the error factor using the first factor and the second factor.

11. The method of claim 10, further comprising adjusting a pitch, roll, or elevation of the antenna in response to the error factor.

12. The method of claim 11, wherein the error factor is determined periodically during a flight of the aircraft.

13. The method of claim 12, further comprising: adjusting a pitch, roll, or elevation of the antenna in response to a stored factor related to at least one previously determined error factor.

14. The method of claim 11, further comprising:
    displaying indicia of the error factor.

15. The method of claim 11, wherein the error factor is determined at least every minute.

16. An apparatus for determining an adjustment to correct at least one position error associated with an antenna of an aircraft radar system, the apparatus comprising:
    means for determining a first factor related to a first range from the weather radar returns;
    means for determining a second factor related to a second range using altitude information; and
    means for determining the adjustment using the first factor and the second factor.

17. The apparatus of claim 16, wherein the means for determining the first factor, the means for determining the second factor, and the means for determining the adjustment are implemented using software.

18. The apparatus of claim 17, wherein the first factor and second factor are calculated using dB values.

19. The apparatus of claim 18, wherein the first factor and the second factor are delta dB values representing an angle to the surface of the Earth.

20. The apparatus of claim 19, wherein the error factor is qualified before being used to determine the adjustment.

* * * * *